United States Patent [19]

Simelunas et al.

[11] Patent Number: 4,629,056
[45] Date of Patent: Dec. 16, 1986

[54] YEAST CAKE TUMBLER

[75] Inventors: William J. Simelunas, Glen Rock; Agostino J. Aquino, Paterson; Nicholas Polifroni, Cliffside Park, all of N.J.

[73] Assignee: Nabisco Brands, Inc., Parsippany, N.J.

[21] Appl. No.: 616,105

[22] Filed: Jun. 1, 1984

[51] Int. Cl.$^4$ .............................................. B65G 47/24
[52] U.S. Cl. .................................. 198/406; 198/409; 198/410
[58] Field of Search ............... 198/406, 407, 409, 410, 198/429, 427, 485, 773, 747, 468, 11

[56] References Cited

U.S. PATENT DOCUMENTS

| | | | |
|---|---|---|---|
| 1,602,719 | 10/1926 | Straight | 198/409 |
| 2,011,344 | 8/1935 | Kelly | 198/747 |
| 2,370,325 | 2/1945 | Ranney | 198/402 |
| 2,387,674 | 10/1945 | McIntire | 193/47 |
| 3,144,120 | 8/1964 | Neiheisel | 193/47 |
| 3,160,287 | 12/1964 | Hinchliffe | 198/410 |
| 3,255,867 | 6/1966 | Allen et al. | 198/773 |
| 3,679,070 | 7/1972 | Skiba, Jr. | 198/402 |
| 3,876,057 | 8/1975 | Jones | 198/430 |
| 4,130,048 | 12/1978 | Lewallyn | 409/158 |
| 4,302,141 | 11/1981 | Miguel | 414/119 |

FOREIGN PATENT DOCUMENTS 0531862  8/1931  Fed. Rep. of Germany ...... 198/406
1256152 12/1967  Fed. Rep. of Germany ...... 198/427

Primary Examiner—Joseph E. Valenza
Assistant Examiner—D. Glenn Dayoan
Attorney, Agent, or Firm—Richard Kornutik

[57] ABSTRACT

A yeast cake device for reorienting yeast cakes by a tumbling operation has a single reciprocating part. The reciprocating part is a reciprocating ram having an upper arm and a lower arm. The upper arm serves to push articles to be tumbled across a first shelf. The tumbling occurs from the first half and onto the lower arm of the reciprocating ram. Upon retraction during a backstroke of the reciprocating ram, the article supported by the lower arm brings the article into engagement with the first shelf such that the article remains stationary while the lower arm moves beneath the article. During retraction, the center of gravity of the article lies beyond a free edge of the lower arm such that the article tumbles for a second time through a 90 degree revolution and onto a second shelf. During another stroke, the lower arm again engages the article so as to push the article onto a conveyor belt. In another embodiment, the upper arm is sufficiently longer to need no other articles present to tumble any other articles. In still another embodiment, the lower arm and the second shelf are not present, instead the conveyor belt is located under the first shelf and either a 90 degree rotation or a 180 degree rotation is caused.

12 Claims, 9 Drawing Figures

YEAST CAKE TUMBLER

BACKGROUND OF THE INVENTION

This invention relates to an apparatus for reorienting yeast cakes by a tumbling operation and delivering the tumbled yeast cakes to a conveyor.

This invention may also be adapted for use in tumbling any regular rectangular prismatic articles selectively through a rotation of either 90 degrees or 180 degrees.

It is well-known and conventional in the packaging and assembly industries to rotate articles being processed. In some cases, the articles being processed must be rotated about an axis of the article in order to continue the manufacturing or packaging steps. In the packaging industry, for example, a package may be formed about an intermediate article and then folded along what is at that moment the top of the intermediate article. In packaging, it is not desirable generally to display articles with the folded portions of wrapping face-up. Therefore, these articles must be tumbled 180 degrees in order to rotate the folded side to the bottom position. In a manufacturing process, articles must be rotated or tumbled in order to bring a particular side into engagement with a particular machining or packaging step.

The prior art tumbling devices as described above have several drawbacks. Prior art tumbling devices generally are made of relatively complex, multi-stage devices requiring multiple conveyors, handlers, and support shelves. Furthermore, the prior art tumbling devices generally use more than a single reciprocating part and therefore are subject to breakdown, high maintenance requirements, and heavy capital investment requirements compared to the tumbling device of the present invention. Also, the prior art tumbling devices cannot tumble yeast cakes gently enough to avoid damage to the edges and corners of the yeast cakes.

When a stream of articles to be tumbled enters a tumbling area, it is convenient to tumble a plurality of articles simultaneously. It is also desirable that the tumbled articles then be immediately conveyed away from the tumbling area in as simple a step as possible. Some of the prior art tumbling devices cannot tumble a plurality of articles simultaneously.

Examples of prior art devices wherein multiple shelves and multiple conveyor belts are used to tumble articles include: Lewallyn in U.S. Pat. No. 4,130,048; U.S. Pat. No. 3,679,072 to Skiba, Jr.; Straight in U.S. Pat. No. 1,602,719; U.S. Pat. No. 3,144,120 to Neiheisel; and U.S. Pat. No. 2,387,674 to McIntire.

Lewallyn shows a carpet sample bevelling apparatus and method having multiple conveyor belts and multiple shelves. Here, relatively thin carpet samples are conveyed generally on edge. Conveyor belts are used to convey the samples from position to position so that, by a series of step conveyor belts, the sample is tumbled as it leaves a higher step conveyor belt to a lower step conveyor belt. As noted in the above, this type of device is generally complex, requires generally high maintenance, and requires a high capital investment initially. In Lewallyn, additional processing steps, i.e. bevelling, are used and therefore the overall device must be complex.

Skiba, Jr. shows a machine for package turnover and orientation. The packages or articles turned are rotated through approximately 180 degrees to present the package in position for further processing. Included are a plurality of pairs of chambers formed from sheet material and each chamber is a platform which is progressively retracted after the packages have been severed from web material. Under the influence of gravity, each package in turn tips during its departure from the associated chamber. A plurality of guides which generally form a chute-like path guide the article to a conveyor belt which takes the articles away for further processing. However, a single reciprocating part is not used to tumble the articles, nor is the device a simple one. In this instance, a chute is required as well as a means for separating packages formed from webbed material. Thus, the device and apparatus disclosed in Skiba, Jr. does not rotate packages through 180 degrees in a simple, reciprocating device but rather requires a multi-level conveyor chute which is only adapted to handle a single article at a time. Further, no provision is made in Skiba, Jr. for processing and conveying away a plurality of articles arranged in a linear column upon a conveyor belt.

Straight discloses a tile cutting machine including an endless conveyor together with an off-bearing mechanism for tile cutting. The tile as it is delivered from a horizontal position, is conveyed to a second conveyor belt in a vertical position. A gripper device is used to grip each tile as it passes by and rotated approximately 90 degrees releasing the tile upon a second conveyor belt which conveys the tiles away. However, no simple reciprocating member is shown for tumbling articles 180 degrees. Here, tumbling does not occur, but rather a guided movement through an arc of approximately 90 degrees takes place. The device of Straight is generally complex and capital intensive initially as compared to the present invention, and requires a relatively high degree of maintenance.

Neiheisel shows an article inverter which tumbles articles through a 180 degrees rotation. A stationary shelf is employed as an intermediate impact member in the tumbling operation. A first conveyor is used to provide articles to a series of idler rollers, a first roller being equal in width to that of the first conveyor but the remaining rollers being shorter and terminate at a point which bisects the article to be turned at a point inwardly of its center of gravity. Thus, the article is turned under the influence of gravity about its center of gravity such that it rotates as it falls. This device is generally complex in that the series of rollers and the conveyors belts provided, as well as the intermediate tumbling shelf, requires movement of a plurality of articles including movement of each individual roller and therefore relatively high maintenance requirements are present. Also, a single reciprocating part is not used to tumble the articles. Furthermore, the tumbling operation disclosed by Neiheisel takes place during a single tumbling step which incurs relatively large impact forces since the fall of the tumbled article is not broken at a 90 degrees rotation but rather the tumbling article continues on through the entire 180 degrees rotation in a single step. Thus, the tumbling is less well controlled and the impact forces are correspondingly larger.

McIntire discloses a cleat turner and grading table. Here, articles are rotated through a 90° rotation. Here, two separate conveyor belts are used together with an upwardly-sloping surface which provides an initial height through which the articles to be tumbled can fall. The articles to be tumbled fall by being pushed across a sharp corner of the upwardly-sloping surface and fall upon the second conveyor belt. Articles arriving on the first conveyor belt are used to push leading articles up the upwardly-sloping wall so that they are forced to tumble upon the second conveyor belt. However, no rotation through 180 degrees is taught or suggested by McIntire. Furthermore, no reciprocating member is shown in McIntire to complete rotation of articles through 180 degrees. Although the device of McIntire is generally simple, only a 90 degrees rotation is accomplished.

Other types of tumbling devices are also known. One example is that disclosed by Hinchliffe in U.S. Pat. No. 3,160,287. Here an apparatus for inspecting objects employs a plurality of stationary members cooperating with a plurality of pivotably rotating members. A single elongated article is rotated and moved forwardly along the stationary portions of the apparatus by the moving portions of the apparatus. The moving portions of the apparatus have a jagged tooth section such that while moving upwardly the articles to be rotated are not supported directly under their center of gravity but rather tend to tip about one of the jagged portions and rotate through an angle of less than 90 degrees. During subsequent steps, the moving portion deposits the article upon the stationary portion. The process is repeated until all four sides of the article can be inspected. However, the device of Hinchliffe is generally complex and requires a relatively large capital investment. Moreover, no single reciprocating part is used to accomplish a rotation through 180 degrees. Also, in Hinchliffe, the article repeatedly falls and is lifted again so that its overall path is that of a level zig-zag line. Thus, no overall fall through a vertical height is employed in Hinchliffe. Furthermore, the maintenance requirement of the device in Hinchliffe would be substantial due to the large number of moving parts.

Another type of package turnover device is shown in Renney in U.S. Pat. No. 2,370,325. There, packages of gum are rotated through a 180 degrees rotation by a device which includes various blocks disposed along a level horizontal supporting table along with a pair of conveyor belts which convey articles to be tumbled by frictional gripping action between the opposed conveyor belts. Thus, forward motion of gum packages is caused by opposite gripping forces exerted by moving conveyor belts which advance the gum package articles along a generally level path. Interposed in this generally level path is an initial drop from a first surface to a second surface which causes tumbling rotation of the gum package article through 180 degrees rotation. A second block elevated above the second surface causes further tumbling of the gum package article through an additional 90 degrees rotation. However, the device of Renney does not use a single reciprocating member to tumble an article through 180 degrees, but rather uses a complex pair of conveyor belts straddling a central support shelf and article path. Thus, maintenance requirements would generally be high in the device of Renney due to the requirement that the articles tumbled be gripped along opposing sides. Furthermore, a relatively large capital investment would be required by the device of Renney in that motive force for the two rotating conveyor belts is required, as well as precise alignments between all of the parts to insure the proper frictional gripping action which is still not sufficiently strong as to prevent tumbling of the articles. Also, no net drop in height occurs of the articles to be tumbled in Renney, which also differs from the present invention.

A further type of device is that shown in Miguel in U.S. Pat. No. 4,302,141. A bale destacker is disclosed which employs a chute, side-gripping conveyor means, and an initial vertical drop to rotate bales through 90 degrees. However, the device of Miguel is generally complex and does not in any event rotate the bales 180 degrees. Furthermore, a plurality of articles cannot be simultaneously tumbled so as to be conveyed away in a linear row of articles but rather single articles must be delivered.

SUMMARY OF THE INVENTION

It is accordingly one object of the present invention to provide an improved apparatus which is inexpensive to fabricate, requires no complex equipment in the fabrication thereof, that is reliable, and that is formed of readily available materials and that can be manufactured by persons of ordinary skill in the manufacturing and assembly arts.

A further object of the present invention is to provide an improved apparatus for tumbling articles which employs only a single reciprocating part to cause the entire 180 degrees rotation, in two 90 degree stages, of the articles to be tumbled.

Another object of the present invention is to provide an improved apparatus for tumbling articles which delivers articles in a linear row to a conveyor belt to carry the linear row of articles away from the tumbling apparatus.

A still further object of the present invention is to provide an improved apparatus for tumbling articles wherein tumbling takes place in two stages, a first 90 degree rotation followed by an impact which stops the rotation and a second 90 degree rotation which also stops on an impact after that rotation, such that a full 180 degrees of rotation is achieved with an intermediate impact such that the articles do not continue rotating or tumbling and such that smaller impact forces are encountered at each stage of tumbling.

It is another still further object of the present invention to provide an improved apparatus for tumbling wherein a linear row of articles is fed to the tumbling apparatus, the row of articles is tumbled in a first 90 degree rotation by a forward stroke of the apparatus for tumbling articles, and the remaining 90 degree rotation is achieved by retraction of the movable part of the apparatus for tumbling articles, another forward stroke of the apparatus for tumbling articles delivering a row of articles at a time to a conveyor belt while simultaneously causing further rotation of other articles at an intermediate stage of rotation of tumbling.

Another object of the present invention is to provide a single reciprocating part which cooperates with two spaced shelf members to provide two separate 90 degree stages of tumbling of rectangular prismatic articles such that a forward stroke of the reciprocating part causes a first 90 degree rotation, retraction of the reciprocating part causes a further 90° rotation of the articles, and another forward stroke of the reciprocating part pushes fully tumbled articles onto a means for conveying which delivers the articles in linear rows.

It is another further object of the present invention is to provide an improved apparatus for tumbling articles employing a single forked reciprocating member, a first prong or arm of the fork lying above a first shelf and the second arm or prong of the fork lying below the first shelf and above the second shelf, such that the first shelf is used to initially receive articles to be tumbled, the edge of the first shelf causing actual tumbling through a 90 degree angle of articles on the first shelf, the upper face of the second arm of the reciprocating part receiving the partially tumbled articles, retraction of the reciprocating part causing the article to be tumble by engagement with the first shelf and onto the second shelf by tumbling about the leading edge of the second prong, a further forward reciprocating motion of the reciprocating part using the second arm to bump or push the row of articles which have been fully tumbled through 180 degrees, in two 90 degree stages, onto a conveyor belt in a linear row of articles which are then conveyed away.

It is another object of the present invention to provide a ram and a shelf for tumbling articles 90 degrees directly onto a conveyor belt or other support, the ram being driven in a reciprocating manner to move the articles along the shelf.

Further details and advantages of the present invention appear from the following description of the preferred embodiments shown schematically in the drawings.

DETAILED DESCRIPTION OF THE INVENTION

Figure 1:
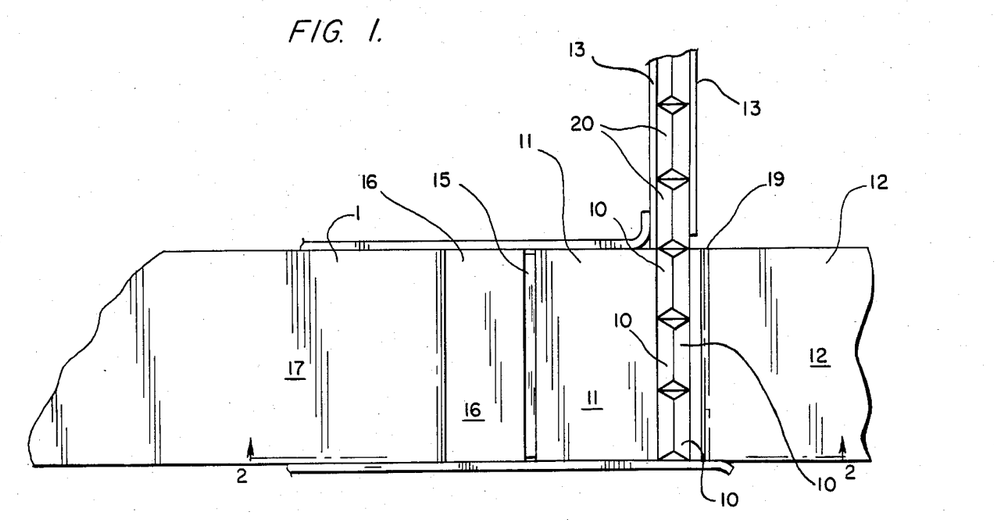
FIG. 1 shows a top elevational view of a tumbling apparatus as used in the present invention including an incoming row of articles to be tumbled, a reciprocating member, a first shelf, a second shelf, and a conveyor belt.

A first row of yeast cakes 10 is shown in FIG. 1 adjacent a ram head 19 of an upper ram arm 12 of a reciprocating ram 14. The ram 14 may be made of any known material such as wood, aluminum, steel, plastic, rubber, or the like. An upper horizontal support shelf 11 is shown partially overlying a lower ram arm 15 which in turn partially overlies a lower horizontal support shelf 16.

The reciprocating ram 14 is to the right of the first row of yeast cakes 10 in FIG. 1, and the first row of yeast cakes 10 is below a second row of yeast cakes 20 in FIG. 1. The ram head 19 may have a resilient material attached at the leftmost end of the ram head 19 in FIG. 1. The resilient material used would lessen impact forces between the ram head 19 and the articles 10. Resilient materials usable include: plastic foam; rubber; resilient plastic; soft wood; steel wool; and the like. A conveyor belt 17 is shown to the left of the lower horizontal support shelf 16 in FIG. 1. The width of the reciprocating ram 14 is approximately equal to that of the first row of yeast cakes 10. Similarly, the upper horizontal support shelf 11 is sufficiently wide to accommodate the first row of yeast cakes 10. The lower ram arm 15 is slightly narrower than the upper horizontal support shelf 11. The underlying lower horizontal support shelf 16 is slightly wider than the overlying lower ram arm 15. the width of the conveyor belt 17 is approximately the same as the width of the lower horizontal support shelf 16.

Figure 2:
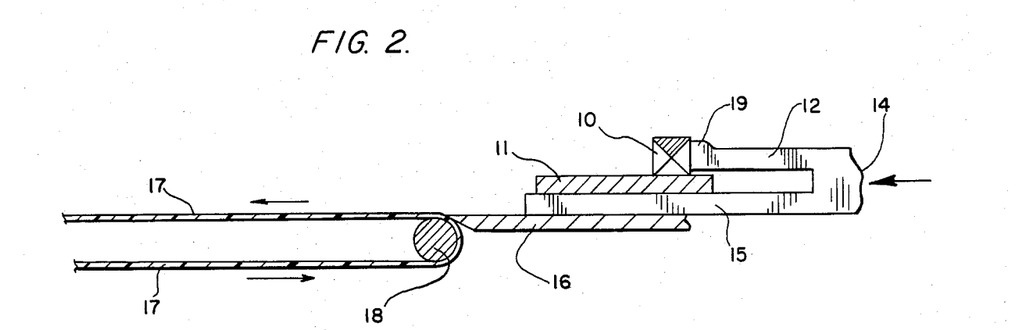
FIG. 2 is a side view partially in section, showing the initial position of a first row of articles to be tumbled.

A side view, partially in section, is shown in FIG. 2 and is taken along line 2—2 of FIG. 1. Here, a side view of the reciprocating ram 14 having an upper horizontal support shelf 11 and a lower ram arm 15 is shown in its rightmost position. The upper horizontal support shelf 11 and the lower ram arm 15 have generally planar facing surfaces which are generally parallel to one another and are separated by a distance sufficient to accommodate and receive the upper horizontal support shelf 11. The upper horizontal support shelf 11 is stationary. The first row of yeast cakes 10 is shown in FIG. 2 abutting the ram head 19.

The first row of yeast cakes 10 is slideably supported upon the upper horizontal support shelf 11 with the reciprocating ram 14 providing a force through the ram head 19 to the first row of yeast cakes 10 to cause sliding in a leftward direction of the first row of yeast cakes 10.

The upper horizontal support shelf 11 and the lower horizontal support shelf 16 have facing surfaces which are generally planer and which are generally parallel to one another, and which are sufficiently spaced apart so as to permit the lower ram arm 15 of the reciprocating ram 14 to pass between them. Also, the upper surface of the lower horizontal support shelf 16 is generally coplaner with the upper surface of the conveyor belt 17. The leftmost edge of the upper horizontal support shelf 11 is a sharp corner. Also the leftmost edge of the lower ram arm 15 is a sharp corner. This is necessary in order to provide for sure tumbling of the first row of yeast cakes 10 as well as all subsequent rows of yeast cakes.

All of the upper and lower surfaces of the parts described in the above are generally shown as being horizontal in FIG. 2. The motion of the reciprocating ram 14 is shown as being in a generally horizontal direction in FIG. 2 such that no interference between the parts shown occurs. The leftmost edge of the lower horizontal support shelf 16 tapers along its underside away from a conveyor belt roller 18 so as to permit the upper surface of the lower horizontal support shelf 16 to be as close as possible to the conveyor belt 17.

Figure 3:
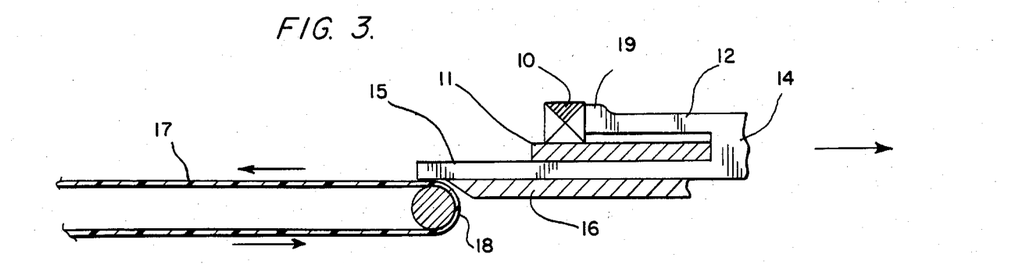
FIG. 3 shows a view similar to that in FIG. 2 above, wherein the reciprocating part has fully advanced to the left and has pushed the articles to be tumbled to the leftmost advanced position.

FIG. 3 is a view similar to that shown in FIG. 2 above, and shows the reciprocating ram 14 in its leftmost position. Here, the first row of yeast cakes 10 is shown in its initial leftmost position and still overlies the upper horizontal support shelf 11. The leftmost edge of the first row of yeast cakes 10 is closely adjacent the leftmost sharp corner of the upper horizontal support shelf 11. Also in FIG. 3, the lower ram arm 15 extends well beyond and to the left of the leftmost portion of the upper horizontal support shelf 11 as well as beyond the leftmost portion of the lower horizontal support shelf 16. The leftmost portion of the lower ram arm 15 overlies the conveyor belt 17 and the conveyor belt roller 18. The rightmost portion of the upper horizontal support shelf 11 in FIG. 3 is closely adjacent the portion of the reciprocating ram 14 which connects the upper ram arm 12 and the lower ram arm 15. Thus, further leftward movement of the reciprocating ram 14 would cause a collision between the reciprocating ram 14 and the upper horizontal support shelf 11, thus the least amount of material is used in the reciprocating ram 14 as relates to the length of the upper ram arm 12 and the lower ram arm 15 since only sufficient space is required between the upper ram arm 12 and the lower ram arm 15 is provided.

The lower ram arm 15 of the reciprocating ram 14 in FIG. 3 generally fills the space between the upper horizontal support shelf 11 and the lower horizontal support shelf 16. Both the upper horizontal support shelf 11 and the lower horizontal support shelf 16 are stationary in all of the figures. The facing surface of the first row of yeast cakes 10 is shown divided into quarters. The uppermost quarter of the first row of yeast cakes 10 in FIG. 3 is shaded. The shaded portion designates the topmost side of the first row of yeast cakes 10 in FIGS. 1–3.

Figure 4:
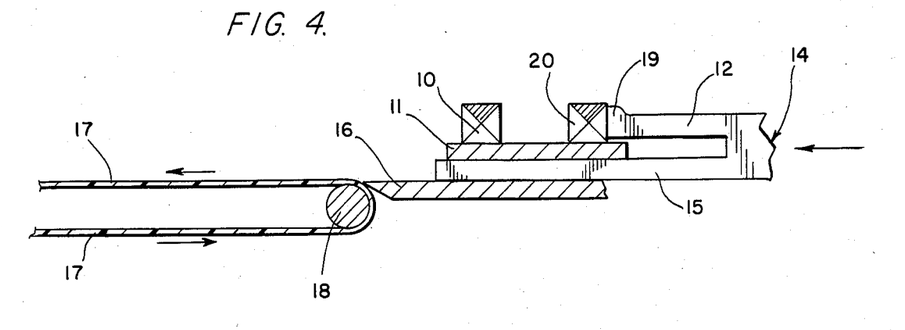
FIG. 4 is a view similar to that shown in FIG. 3 above, wherein a second row of articles to be tumbled is received before a first arm of the reciprocating part.

FIG. 4 is a view similar to that shown in FIG. 3 and shows the reciprocating ram 14 in its rightmost position and having received a second row of yeast cakes 20. The second row of yeast cakes 20 abuts the leftmost edge of the upper ram arm 12, i.e., the ram head 19. The first row of yeast cakes 10 remains in the position to which it was moved by the ram head 19 during the stroke of the reciprocating ram 14 to its leftmost position. The facing surface of the second row of yeast cakes 20 is shown in FIG. 4 as divided into quadrants. The topmost quadrant is shaded, indicating a topmost surface of the second row of yeast cakes 20. The position of the reciprocating ram 14 in FIG. 4 is in its rightmost position just immediately prior to its reciprocating movement in a leftward direction.

Figure 5:
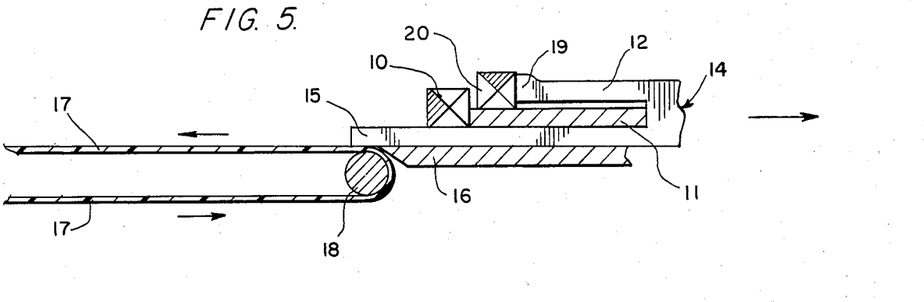
FIG. 5 is a view similar to that shown in FIG. 4 above, wherein the first row of articles to be tumbled has been tumbled through a 90 degree rotation with the reciprocating part in its leftmost position.

FIG. 5 is a view similar to that shown in FIG. 4 with the reciprocating ram 14 in its leftmost position again. In this second leftmost stroke, following the first leftmost stroke shown in FIG. 3, the first row of yeast cakes 10 has been tumbled 90 degrees. The first row of yeast cakes 10 lies with the shaded quadrant facing to the left in FIG. 5. The second row of yeast cakes 20 has taken the position originally held by the first row of yeast cakes 10 in FIGS. 3 and 4 and its shaded portion is in the topmost position. The first row of yeast cakes 10 lies upon the upper surface of the lower horizontal support shelf 16. The rightmost portion of the first row of yeast cakes 10 abuts the leftmost portion of the upper horizontal support shelf 11.

Figure 6:
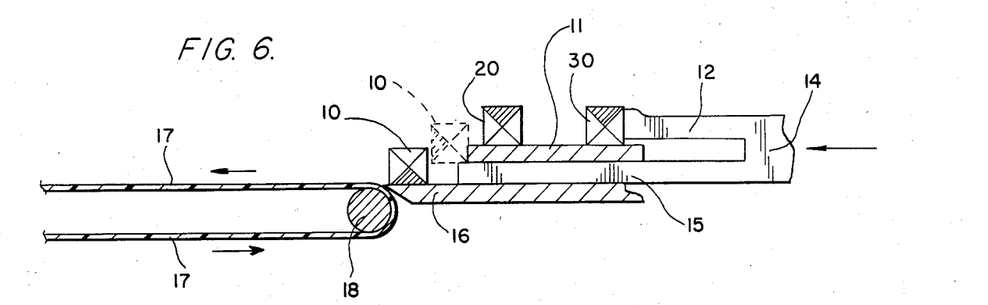
FIG. 6 is a view similar to that shown in FIG. 5 above, with the reciprocating part in its rightmost position receiving a third row of articles to be tumbled.

FIG. 6 is a view similar to that shown in FIG. 5, with the reciprocating ram 14 in its rightmost position similar to that shown in FIGS. 2 and 4. Here, a third row of yeast cakes 30 has been advanced and loaded in front of the ram head 19 of the reciprocating ram 14. As shown by the dotted outline of the first row of yeast cakes 10, as well as the arrow and the solid outline of the first row of yeast cakes 10, the retraction of the rightmost position of the reciprocating ram 14, and in particular the withdrawal to the rightmost position of the lower ram arm 15 of the reciprocating ram 14 has resulted in tumbling of the first row of yeast cakes 10 through a 90 degree angle about the leftmost sharp edge of the lower ram arm 15. The shaded quadrant of the first row of yeast cakes 10 now lies along the bottommost portion, indicating that the first row of yeast cakes 10 has been rotating through a total angle of revolution of 180 degrees. The first row of yeast cakes 10 now lies, in FIG. 6, closely adjacent the leftmost edge of the lower horizontal support shelf 16. The second row of yeast cakes 20 remains in the position which it occupied in FIG. 5 which also corresponds to the position held by the first row of yeast cakes 10 in FIGS. 3 and 4. The reciprocating ram 14 in FIG. 6 is shown just prior to beginning another leftward stroke.

The facing surface of the third row of yeast cakes 30 is shown in FIG. 6 as being divided into quadrants. The uppermost quadrant of the third row of yeast cakes 30 is shaded in FIG. 6. The retraction of the lower ram arm 15 to a point where the sharp angled edge at the leftmost portion of the lower ram arm 15 lies just to the right of the center of gravity of the first row of yeast cakes 10. Thus, under the action of gravity, the yeast cakes of the first row of yeast cakes 10 tumble the additional 90 degrees due to the fact that the first row of yeast cakes 10 cannot move to the right with the lower ram arm 15 due to the presence of the upper horizontal support shelf.

Figure 7:
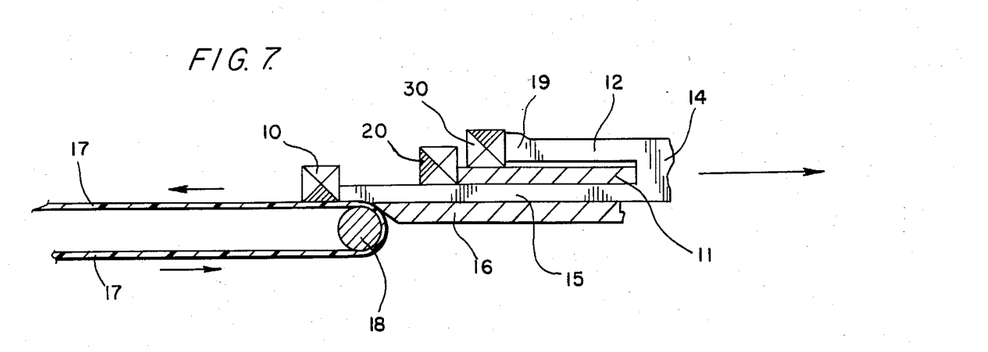
FIG. 7 is a view similar to that shown in FIG. 6 above, with the reciprocating part in its leftmost position again, sufficiently extended to push the first row of articles onto the conveyor belt.

FIG. 7 is a view similar to that shown in FIG. 6 above, but with the reciprocating ram 14 in its leftmost position again. In this position, the third row of yeast cakes 30 corresponds to the position of the second row of yeast cakes 20 in FIGS. 6 and 5, and to the position of the first row of yeast cakes 10 in FIGS. 4 and 3. Thus, the third row of yeast cakes 30 has been pushed to the left by the ram head 19 of the upper ram arm 12 in the reciprocating motion of the reciprocating ram 14.

The leftmost edge of the lower ram arm 15 has pushed the first row of yeast cakes 10 to the left of the center of the conveyor belt roller 18 and onto the moving conveyor belt 17. The motion of the conveyor belt 17 is shown by arrows in FIGS. 2–7. Thus, the first row of yeast cakes 10 will be carried away by the conveyor belt roller 18 to the left in FIG. 7. The second row of yeast cakes 20 has been rotating 90 degrees in FIG. 7 by being bumped or pushed off the sharp leftmost edge of the upper horizontal support shelf 11 by the presence of the third row of yeast cakes 30 which has been pushed to the left by the upper ram arm 12. The position of the second row of yeast cakes 20 corresponds closely to the position of the first row of yeast cakes 10 in FIG. 5 as well as the dotted outline of the first row of yeast cakes 10 in FIG. 6. The position of the reciprocating ram 14 in FIG. 7 is the upmost position of the reciprocating ram 14 and just as rightward motion of the reciprocating ram 14 is about to begin.

Figure 8:
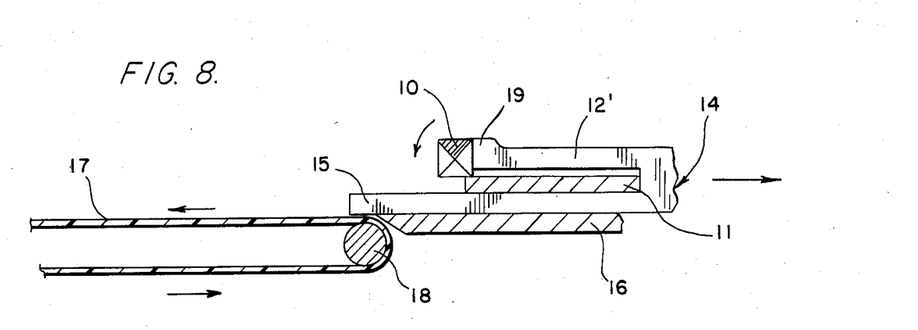
FIG. 8 is a view of an alternative embodiment similar to that shown in FIG. 3, but having a relatively longer upper ram arm so that a single stroke of the ram moves a single article or row of articles and tumbles them at the leftmost extent of the stroke.

FIG. 8 is a side view, partially in section, of an alternative embodiment of the invention. The upper ram arm $12^1$ is relatively longer in this embodiment than the upper ram arm 12 in the previous figures. The length of upper ram arm $12^1$ is greater than that of upper ram arm 12 by a distance equal to the width of a yeast cake in FIG. 8. All other parts retain their original scale from the preceding figures. The greater length of the upper ram arm $12^1$ allows it both to push a single row of articles 10 across the upper shelf 11 and, at the end of the leftward stroke, to tumble the same row of articles 10 through a 90 degree rotation.

Figure 9:
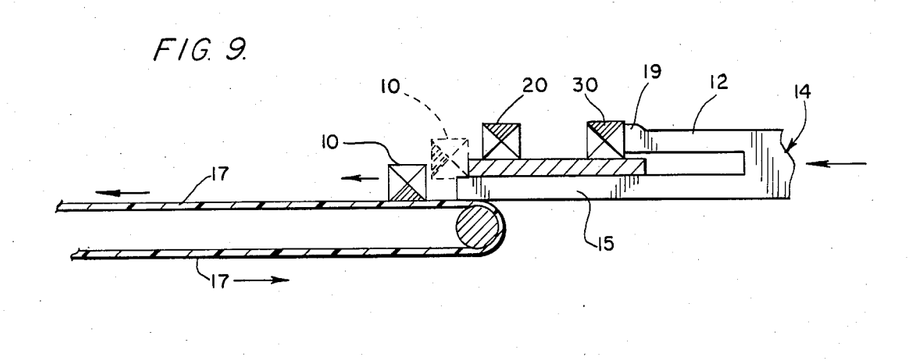
FIG. 9 is a view of another embodiment, similar to that shown in FIG. 7, but wherein the lower shelf has been replaced directly by the conveyor belt.

FIG. 9 shows a side view partially in section of another alternative embodiment of the present invention. Here, the lower shelf 16 has been omitted and its necessary support function has been replaced by the conveyor belt 17. Other supports could be used in place of the conveyor belt, in addition to a stationary flat surface, for example a chute (angled downward to the left or downward at a generally right angle to the plane of the figure).

In operation, the yeast cake tumbler of the present invention works as follows. A first row of yeast cakes 10 is delivered from a delivering mechanism (shown in FIG. 1 simply as a pair of upstanding sidewalls 13,13) to a position just before the ram head 19 of the reciprocating ram 14. The delivering mechanism may be a chute, a conveyor belt, a pusher mechanism with intermittent motion, or a conveyor belt in combination with a stop bar which intermittently stops a yeast cake in its travel so that continuous yeast cake movement does not occur.

The first row of yeast cakes is pushed from the righthand portion of the upper horizontal support shelf 11 by the ram head 19 to a lefthand portion of the upper horizontal support shelf 11. The first row of yeast cakes 10 is pushed to within a distance of the leftmost edge of the upper horizontal support shelf 11 which is equal to slightly less than one-half the width of a single first row of yeast cakes 10. The lower ram arm 15 passes beneath the upper horizontal support shelf 11 and over the lower horizontal support shelf 16 in FIG. 2, however, no rows of yeast cakes are present to be operated upon by movement of the lower ram arm 15.

The reciprocating ram 14 is retracted to its rightmost position again, and the delivery mechanism delivers a second row of yeast cakes 20 to a position just in front of the upper ram arm 12 abutting the ram head 19 of the upper ram arm 12. The first row of yeast cakes 10 remains in the position near the leftmost edge of the upper horizontal support shelf 11. The reciprocating ram 14 reciprocates again to the left as shown in FIG. 5. During this operation, the ram head 19 which abuts the second row of yeast cakes 20 pushes the second row of yeast cakes 20 to the left until the second row of yeast cakes 20 abuts and pushes against the first row of yeast cakes 10. Further pushing of the second row of yeast cakes 20 by the ram head 19 results in movement of the first row of yeast cakes 10 to the left such that the center of gravity of the first row of yeast cakes 10 overlies the sharp leftmost edge of the upper horizontal support shelf 11. Thus, under the action of gravity, the first row of yeast cakes 10 tumbles 90 degrees about the sharp corner at the leftmost portion of the upper horizontal support shelf 11.

FIG. 6 shows the reciprocating ram 14 in its rightmost position again, which causes tumbling of the first row of yeast cakes 10. As seen in FIG. 6 by the dotted outline of the first row of yeast cakes 10, the first row of yeast cakes 10 slides relative to the lower ram arm 15 due to the presence of the leftmost edge of the upper horizontal support shelf 11.

As the lower ram arm 15 reaches its rightmost position, the center of gravity of the first row of yeast cakes 10 overlies an area just to the left of the leftmost edge of the lower ram arm 15 and thus the force of gravity causes the first row of yeast cakes 10 to tumble a second time through 90 degrees. The first row of yeast cakes 10 stops its tumbling motion upon the lefthand portion of the lower horizontal support shelf 16. Also shown in FIG. 6, is the presence of the third row of yeast cakes 30 which has been delivered to a position adjacent the ram head 19 of the upper ram arm 12. The second row of yeast cakes 20 remains in the position in which it was pushed by the ram head 19 in FIG. 5. Note in FIG. 6 that the tumbling motion of the first row of yeast cakes 10 does not occur until the reciprocating ram 14 has reaches its rightmost position. Thus, the lower ram arm 15 has served the first of its two functions, i.e., to provide a support which, when withdrawn causes a 90 degree tumble of the yeast cakes of the first row of yeast cakes 10.

In FIG. 7, the reciprocating ram 14 has reached its leftmost position, which the second row of yeast cakes 20 has tumbled through a 90 degree revolution as previously occured with the first row of yeast cakes 10 in FIG. 5. This tumbling of the second row of yeast cakes 20 is due to the pushing of the third row of yeast cakes 30 by the ram head 19 in FIG. 7.

The lower ram arm 15 is shown in FIG. 7 performing the second of its functions: pushing the first row of yeast cakes 10 to the left and onto the conveyor belt 17. At this point, the conveyor belt 17 carries away the first row of yeast cakes 10 to the left as suggested by the arrow in FIG. 7. The reciprocating ram 14 will next return to its rightmost position and a new cycle with a new row of yeast cakes will begin.

The operation of the device shown in FIG. 8 is substantially the same as that of FIGS. 1–7, except that no second row of yeast cakes is necessary on the upper shelf 11 to effect tumbling through a 90 degree rotation of the first row of articles 10. When the second row of yeast cakes 20 is employed in the upper shelf 11 to effect tumbling of the first row 10, the second row 20 acts as a resilient buffer between the ram head 19 and the first row 10. In FIG. 8 however, since no second row is used, it is desirable (though not necessary) to provide a resilient member for contacting face of the ram head. This would provide smoother operation and surer tumbling through the initial 90 degree rotation, and avoid high impact forces to the yeast cakes 10 which might tend to damage the yeast cakes 10.

The operation of the device shown in FIG. 9 is substantially the same as that of FIGS. 1–5, except that, at FIG. 5, the first row of yeast cakes 10 is tumbled through a 90 degree rotation directly onto the conveyor belt 17.

A hybrid embodiment is possible between the FIGS. 8 and 9 embodiments. Here, the upper ram arm 12[1] would be the same as in FIG. 8, and have the same operation; and the lower shelf would be omitted as in the FIG. 9 embodiment, to be replaced by the conveyor belt 17 (or by any other device or means for removing yeast cakes, e.g. manually, by a chute, or the like).

Although planer support surfaces and generally planer ram arms are shown, nonplaner surfaces may be used as well so long as there are no interferences between the parts. Also, an enlarged ram head 19 is shown relative the upper horizontal support shelf 11. Any ram head 19 shape or size may be used connected to the upper ram arm 12 and not just an enlarged end. Also, any material could be used for the ram head, and the ram head attached to the upper ram arm 12 but welding, bolts, glue, dovetail joint, or any other conventional means of attachment. Also, although a conveyor belt is shown, a delivery chute may be used which descends in elevation moving to the left in the figures. Also, open boxes could be present instead of a conveyor belt in the figures and the boxes removed manually, or by automated equipment as desired.

Also, although yeast cakes are discussed in connection with the above description, any rectangular articles could be used, for example, bricks, squared carpet samples, packages for diverse types of articles, and the like. The articles used may be solid or hollow, soft or hard, light or heavy.

The reciprocating ram 14 may be formed of any material, for example, wood, aluminum, steel, iron, copper, plastic, copolymers of vinyl resins, polyethylene, polypropylene, or any other material which is sufficiently strong to support the articles to be tumbled. Furthermore, the upper horizontal support shelf 11 and the lower horizontal support shelf 16 may be formed of any materials which are known to be sufficiently strong to support articles which are tumbled. For example, any of the above-enumerated materials may conventionally be used. For a sufficiently light article such as a yeast cake, materials of choice could even include cardboard, clay or porcelain, or the like. The reciprocating ram 14 may also be a composite article, assembled from smaller pieces.

Delivery mechanisms are well known in the manufacturing, processing, and packaging arts. One type of known mechanism includes a conveyor belt with a relatively low coefficient friction with the articles to be tumbled such that an arm may be used to stop any of the articles at any point thereby stopping the entire chain of articles on the conveyor belt. Thus, during an operation of the ram, the articles not directly adjacent the ram head 19 may be stopped from further movement by such a device. On the other hand, the reciprocating ram 14 has vertical sides which themselves are used to prevent further entry of articles to be tumbled. The reciprocating ram 14 preferably has solid sides which upon reciprocating motion of the ram 14, block further movement of the articles to the ram head 19 until such time that the reciprocating ram 14 has returned to the right-hand position. As shown in FIG. 1, an upstanding stop wall 1 may be provided to stop movement of all of the yeast cakes in the row. For example, if a conveyor belt is used under the second row of yeast cakes 20, to provide motion to the second row of yeast cakes 20, the stop wall in combination with the presence of the first row of yeast cakes 10, prevents further movement of the second row of yeast cakes 20. Similarly, if the upstanding sidewalls 13,13 retain the second row of yeast cakes 20 in FIG. 1 upon a chute, the presence of the stop wall 1 will also prevent further movement of the second row of yeast cakes 20 due to the presence of the first row of yeast cakes 10 in front of the ram head 19.

During movement of the ram head 19, the upstanding sidewalls 13,13 in FIG. 1 prevent sideways movement either to the left or to the right of the nearest yeast cake of the second row of yeast cakes 20 due to frictional contact with the adjacent sidewall of the reciprocating ram 14.

The yeast cakes shown in the figures may be ordinary yeast cakes which have been wrapped with a sheet material to create the folds shown in FIG. 1. The sheet material used may be any conventional food wrapping paper such as aluminum foil, laminated paper having an aluminum foil side, or any other type of wrapping paper conventional in the packaging arts. Unwrapped yeast cakes may also be used, if desired.

The improved yeast cake tumbling device of the present invention is capable of achieving the above-enumerated objects and while preferred embodiments of the present invention have been disclosed, it will be understood that it is not limited thereto, but may be otherwise embodied within the scope of the following claims.

What is claimed is:

1. An apparatus for tumbling articles, comprising:

a reciprocating ram having a body portion and a horizontally extending upper arm and a horizontally extending lower arm intergrally connected to said body portion, said upper arm being cantilever supported from said body portion;

said upper arm having a vertical free edge which is adapted to contact and push articles;

said lower arm having a horizontal support surface terminating in a vertical free edge perpendicular to said lower arm support surface to form a sharp corner at said free edge, said free edge being adapted to contact and push articles;

said reciprocating ram moving along a single linear path; said linear path lying substantially in a horizontal plane;

a first shelf directly underlying the path of travel of said upper arm and directly overlying the path of travel of said lower arm; said first shelf having a horizontal support surface terminating in a vertical free end perpendicular to said shelf support surface to form a sharp corner at said free end;

a second shelf directly underlying the path of travel of said lower arm;

said first shelf and said second shelf each having a substantially horizontal planar upper surface adapted to support articles;

said upper arm and said lower arm being in a constant, fixed predetermined relationship through a full range of motion of said reciprocating ram during its travel along said single linear path;

said reciprocating ram having a forward stroke and a back stroke;

said first shelf and said second shelf each being fixed and spaced apart from one another a predetermined distance;

said first shelf having a length greater than the length of said upper arm at the forward most extent of said forward stroke and said upper arm having a length sufficient to cause a first article supported on said first shelf in front of said free edge of said upper arm to advance during said forward stroke through contact with a second article supported on said first shelf between said upper arm and the first article, to be positioned on said first shelf at the forward most extent of said forward stroke such that the center of gravity of the first article overlies said sharp corner of said first shelf to cause the first article to tumble over said free end under the action of gravity such that the first article tumbles forward over said free end of said first shelf;

the upper surface of said lower arm being spaced from a lower surface of said upper arm by a distance greater than a thickness of said first shelf;

said lower arm having a length relative to said first shelf such that at the rear most extent of said back stroke the center of gravity of an article supported on said lower arm is positioned to overlie said sharp corner of said lower arm to cause the article to tumble over said free edge under the action of gravity such that the article tumbles forward over said free edge of said lower arm without being in contact with said free end of said first shelf;

whereby an article supported on said first shelf can remain stationary when not in contact with said reciprocating ram, and is pushed by said reciprocating ram by the upper arm thereof during a forward stroke to a position near the first edge of said first shelf, so that a second said forward stroke of said reciprocating ram pushes the second article into contact with the first article to cause the first article to tumble over said free end of said first shelf through a predetermined rotation onto said lower arm, and further whereby during a second back stroke of said reciprocating ram said lower arm brings the first article backwards into contact with said free end of said first shelf such that the article remains stationary relative to said first shelf while said lower arm is withdrawn beneath the article such that at the rear most extent of said backstroke said reciprocating ram causes the first article to tumble through a second predetermined rotation over said free edge of said lower arm and onto said second shelf.

2. An apparatus as claimed in claim 1, further comprising a means for moving said reciprocating ram.

3. An apparatus as claimed in claim 2, further comprising a means for receiving articles;

whereby in said forward stroke of the reciprocating ram said lower arm pushes the article which has been tumbled from said second shelf to said means for receiving articles.

4. An apparatus as claimed in claim 2, further comprising a means for supplying articles to said first shelf for tumbling of the articles;

whereby during a backstroke of said reciprocating ram an article is supplied onto said first shelf forward of said free edge of said upper arm of said reciprocating ram.

5. An apparatus as claimed in claim 4, further comprising a means for stopping articles supplied to said first shelf by said means for supplying articles;

whereby each article supplied to said first shelf forward of said free edge of said upper arm is stopped so that a forward stroke of said reciprocating ram will push each of the articles supplied across said first shelf.

6. An apparatus as claimed in claim 4, further comprising a pair of upstanding guide walls disposed parallel to the path of motion of said reciprocating ram;

whereby an article is retained between the said pair of guide rails and is pushed by said reciprocating ram to the full extent possible in a forward direction during a forward stroke of said reciprocating ram.

7. An apparatus as claimed in claim 4, wherein said upper arm of said reciprocating ram has two upstanding side walls which are disposed generally parallel to the direction of travel of said reciprocating ram;

one of said two upstanding side walls being disposed nearer said means for supplying articles and being adapted for sliding contact with an article during reciprocating motion of said upper arms;

whereby said upstanding sidewall disposed adjacent said means for supplying articles prevents further articles from being supplied to said first shelf during at least a portion of said forward stroke and at least a portion of the backstroke of said reciprocating ram.

8. An apparatus as claimed in claim 7, wherein said free edge of said upper arm is adapted for sliding contact with articles;

said free edge of said upper arm being located during a backmost position of said backstroke to guide articles in a generally linear path, which is transverse to said linear path of travel of said reciprocating ram, by frictional sliding contact with articles;

whereby motion of the articles in front of said free edge of said upper arm is guided by said free edge of said upper arm so that the articles are arranged forward of said free edge of said upper arm so as to be moved during said forward stroke of said reciprocating ram across said first shelf.

9. An apparatus as claimed in claim 3, wherein said means for receiving articles is a conveyor belt;

whereby articles received are carried away from said second shelf by said conveyor belt.

10. An apparatus as claimed in claim 1, wherein the first predetermined angle of rotation of the article is 90 degrees.

11. An apparatus as claimed in claim 10, wherein the second predetermined angle of rotation of the article about said free edge of said lower arm is 90 degrees;

whereby the combined angle of rotation of an article about said free end of said first shelf and about said free edge of said lower arm is 180 degrees.

12. An apparatus for tumbling articles, comprising:

a reciprocating ram having a body portion and a horizontally extending upper arm and a horizontally extending lower arm integrally connected to said body portion, said upper arm being cantilever supported from said body portion;

said upper arm having a vertical free edge which is adapted to contact and push articles;

said lower arm having a horizontal support surface terminating in a vertical free edge perpendicular to said lower arm support surface to form a sharp corner at said free edge, said free edge being adapted to contact and push articles;

said reciprocating ram moving along a single linear path; said linear path lying substantially in a horizontal plane;

a first shelf directly underlying the path of travel of said upper arm and directly overlying the path of travel of said lower arm; said first shelf having a horizontal support surface terminating in a vertical free end perpendicular to said shelf support surface to form a sharp corner at said free end;

a second shelf directly underlying the path of travel of said lower arm;

said first shelf and said second shelf each having a substantially horizontal planar upper surface adapted to support articles;

said upper arm and said lower arm being in a constant, fixed predetermined relationship through a full range of motion of said reciprocating ram during its travel along said single linear path;

said reciprocating ram having a forward stroke and a back stroke;

said first shelf and said second shelf each being fixed and spaced apart from one another a predetermined distance;

said first shelf having a length greater than the length of said upper arm at the forward most extent of said forward stroke and said upper arm having a length sufficient to cause an article supported on said first shelf in front of said free edge of said upper arm to advance during said forward stroke to be positioned on said first shelf at the forward most extent of said forward stroke such that the center of gravity of the first article overlies said sharp corner of said first shelf to cause the article to tumble over said free end under the action of gravity such that the article tumbles forward over said free end of said first shelf without being in contact with said free edge of said upper arm;

the upper surface of said lower arm being spaced from a lower surface of said upper arm by a distance greater than a thickness of said first shelf;

said lower arm having a length relative to said first shelf such that at the rear most extent of said back stroke the center of gravity of an article supported on said lower arm is positioned to overlie said sharp corner of said lower arm to cause the article to tumble over said free edge under the action of gravity such that the article tumbles forward over said free edge of said lower arm without being in contact with said free end of said first shelf;

whereby an article supported on said first shelf can remain stationary when not in contact with said reciprocating ram, and is pushed by said reciprocating ram by the upper arm thereof during a forward stroke to cause the article to tumble over said free end of said first shelf through a predetermined rotation onto said lower arm, and further whereby during a back stroke of said reciprocating ram said lower arm brings the article backwards into contact with said free end of said first shelf such that the article remains stationary relative to said first shelf while said lower arm is withdrawn beneath the article such that at the rear most extent of said backstroke said reciprocating ram causes the article to tumble through a second predetermined rotation over said free edge of said lower arm and onto said second shelf.

* * * * *